Aug. 19, 1947.  M. F. CHEEK  2,426,081
WHEELBARROW
Filed Oct. 15, 1945  2 Sheets-Sheet 1

INVENTOR.
Millard F. Cheek.
BY
Fishburn & Mullendore
ATTORNEYS

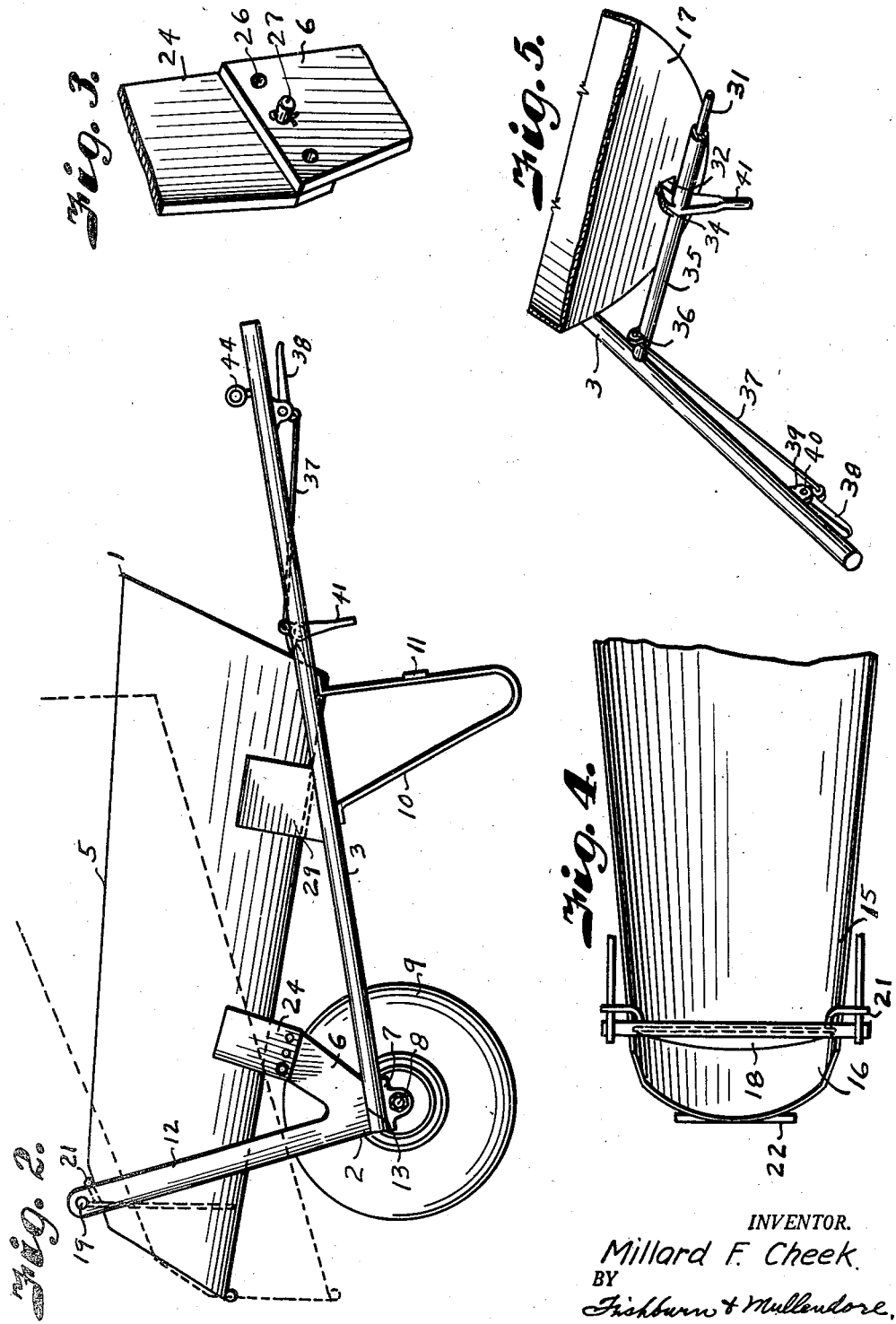

Patented Aug. 19, 1947

2,426,081

UNITED STATES PATENT OFFICE 2,426,081

WHEELBARROW

Millard F. Cheek, Liberty, Mo.

Application October 15, 1945, Serial No. 622,384

10 Claims. (Cl. 298—3)

This invention relates to improvements in wheelbarrows, and particularly to a device of that character in which the container or carrying receptacle is pivotally and adjustably mounted on the support or frame so that the forward end of the receptacle will swing downwardly from the carrying position to a tilting dumping position.

My invention is an improvement over Patent No. 1,817,934 of August 11, 1931.

The principal objects of my invention are to provide a wheelbarrow having a receptacle adjustably mounted on a support on the frame so that the receptacle may be shifted forwardly or backwardly on the frame to balance the load thereon; to provide a closure for the forward end of the receptacle in which the material being carried in the receptacle exerts pressure thereon; to provide a tight fit in the end of the receptacle, thereby preventing plastic material, such as mortar, cement, water, sand, or the like from leaking out through the open front end when the wheelbarrow is being trundled over the ground surface, down an incline, or other usual surface; to provide means for latching the rear end of the receptacle to the frame; to provide means for releasing the latching means when it is desired to dump the load carried by the receptacle; and to provide a device of this kind which is simple, cheap, strong, durable, and one in which the material being carried may be dumped by automatic swinging of the receptacle on the frame upon release of the latching means.

In accomplishing these and other objects of the present invention, I have provided improved details of structure, the preferred form of which is illustrated in the accompanying drawings wherein:

Fig. 2 is a side view of the device showing the receptacle in dumping position by dotted lines.

Fig. 3 is an elevational view of the support showing the adjustment with respect to the receptacle body.

Fig. 4 is a plan view of the forward portion of the receptacle particularly illustrating the closure member.

Fig. 5 is a fragmentary view of the frame showing the latching means on the rear of the receptacle.

Figure 1:
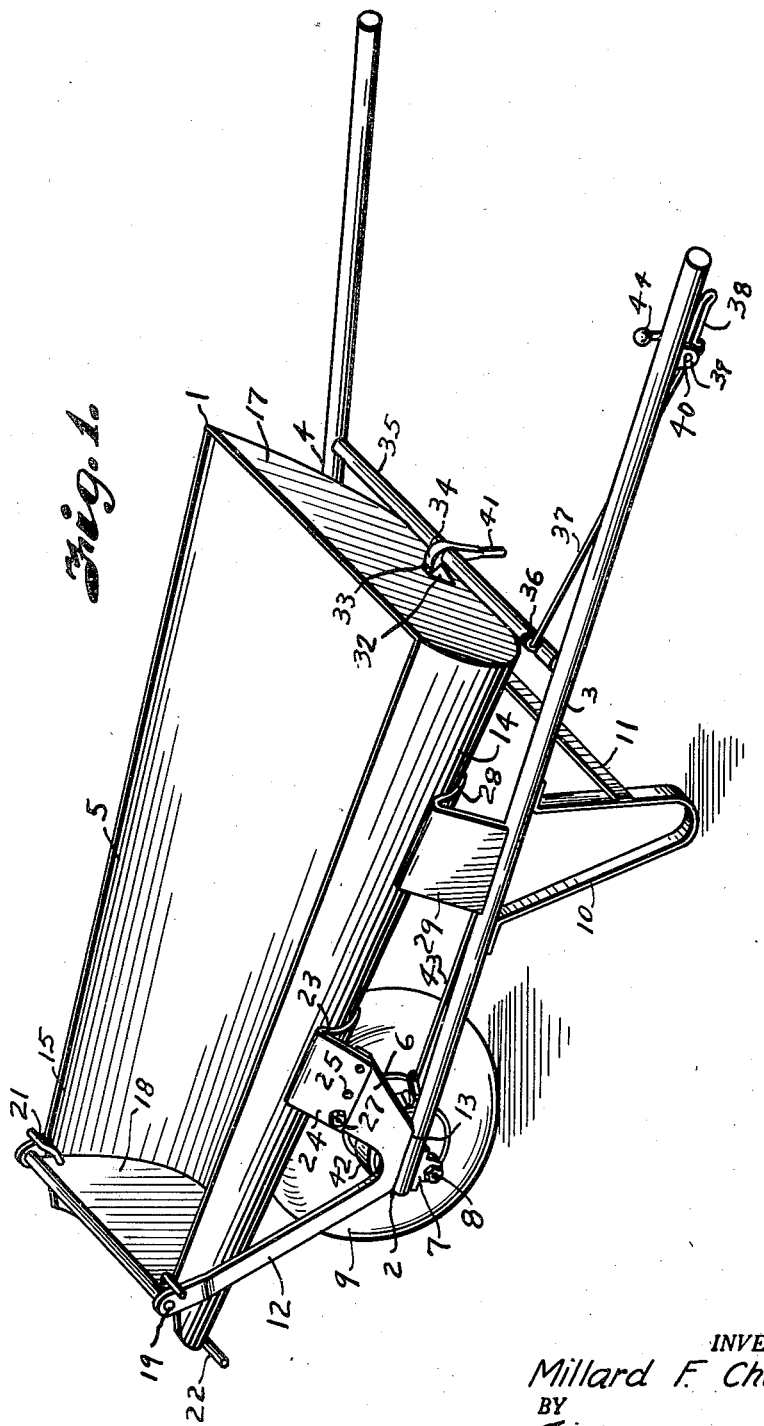
Fig. 1 is a perspective view of a wheelbarrow embodying the features of my invention.

Referring more in detail to the drawings:

1 designates a wheelbarrow embodying the features of my invention which comprises a framework 2 having side rails 3 and 4, the rear extensions thereof forming handle members, a receptacle 5 carried on the frame by upwardly extending supports 6 on each side of the receptacle.

Rigidly secured to the underneath side at the forward end of the side rails 3 and 4 by welding or other suitable manner are bearing members 7 adapted to receive an axle 8 for a carrying wheel 9 between the side rails. Legs 10 are rigidly secured by welding or the like to the underneath side of the side rails rearwardly of the wheel for supporting the device when not in motion. A cross bar 11 is attached to the legs 10 to lend rigidity thereto.

The frame 2 is substantially V-shaped comprising the support 6 and an upstanding arm 12, the lower end of the frame being rigidly secured to the forward end of the side rails 3 and 4 by welding or other suitable manner, as indicated at 13.

The receptacle 5 has rounded sides and bottom portion as indicated at 14 (Fig. 1), and is tapered toward the forward end as indicated at 15 (Fig. 4). The receptacle has an open forward end as indicated at 16 (Fig. 4), and a closed rear end 17. The open front end is provided with a door or closure member 18 pivotally supported on the top of the arm 12 of the V-shaped support by a cross rod 19. The door may be spot welded to the rod or its top side rolled around the rod as desired. I have here illustrated the closure member as being rigidly secured to the rod 19 and having pivotal connection with the arm 12. If desired, the cross rod 19 could be rigidly secured to the supports and the closure member hinged on the rod. Rigidly secured to the sides of the closure 18 near the top thereof are hooks 21 adapted to contact the rear side of the top of the upstanding arm 12 to prevent the closure member from swinging forwardly when the receptacle is in dumping position as shown in Fig. 2. The door may, however, be swung backwardly and upwardly if desired. The bottom portion of the open end of the receptacle is provided with a bar 22 which may be utilized for contacting a surface in dumping the material from the receptacle as later described.

Rigidly secured to the respective sides of the receptacle by welding, rivets or the like are supporting members 23 having downwardly extending arms 24 provided with openings 25 adapted to align with openings 26 on the upstanding arm 6 of the supporting member carried by the side rails 3 and 4. The arms 6 and 24 are secured to each other by a bolt or the like 27 and provide pivotal mounting of the receptacle on the supporting arm 6.

A support is provided for the rear end of the receptacle comprising a member 28 curved to conform to the contour of the bottom of the receptacle and has its outer ends turned downwardly forming arms or standards 29 which are rigidly secured to the respective side rails 3 and 4 toward the rear portion thereof and approximately above the supporting legs 12. If desired, the support 28 may be provided with a felt or like material (not shown) to cushion the receptacle when dropping on the support.

A cross rod 31 having its ends rigidly secured to the respective side rails 3 and 4 adjacent the rear end 17 of the receptacle is adapted to support latching means for latching the receptacle to the bar when in loaded position. A plate 32 is rigidly secured to the rear end of the receptacle near the bottom thereof having an opening 33 therein adapted to receive a latch 34 rigidly secured to substantially the center of a tube 35 sleeved over the rod 31. The end of the tube 35 near the rail 3 is provided with an ear 36. A rod 37 having one end pivotally connected to the ear 36 extends backwardly along the side rail 3 and has its opposite end pivotally connected to a finger lever 38 also pivotally secured to an ear 39 of the handle 3 as indicated at 40 (Fig. 5). The latch 34 is provided with a handle 41 for unlatching the latch from the receptacle by hand if desired.

The axle 10 is provided with a brake drum 42 including braking mechanism therein such as friction belt (not shown), and having a rod or cable 43 extending rearwardly along the rail 3 and secured thereto by any suitable means and having a lever 44 extending upwardly from the handle 3 for operation by the operator of the wheelbarrow when the device is in immobile position.

Operation of a device constructed and assembled as described is as follows:

When the receptacle is in loading position as illustrated in Fig. 1, the latching member 34 will be engaged in the opening in the plate of the rear end 17 of the receptacle to hold the receptacle in load bearing position. The closure 18 will contact the bottom and sides of the forward part of the receptacle and the material placed in the receptacle will exert forward pressure on the closure. The receptacle being tapered forwardly, the more forward exertion on the closure, the tighter the closure will be pressed into closing position. If desired, the outer circumference of the closure may be provided with a resilient material to make the receptacle water-tight.

When the operator desires to transport the load to a dumping location, he grasps the handles of the side rails of the wheelbarrow and wheels it to such location and by upward pull on the finger lever 38 with the fingers of the hand of the operator without releasing his hand from the handle member, the latching means will be released and the weight of the load being to the forward end of the receptacle, the rear end of the receptacle will be tilted upwardly on the pivot pin 27 of the supporting arms 6 and 24, respectively, causing the forward end of the receptacle to be tilted forwardly and downwardly away from the closure 18, and the material will be dispensed out of the receptacle under the door, as best illustrated in dotted lines in Fig. 2. After the load has been dumped, the rear end of the receptacle being heavier than the forward end, the receptacle will again resume its loading position on the support 28 and be engaged with the latching mechanism to hold it in place until the next dumping operation.

When the receptacle is tilted to its original carrying position, the closure 18 will enter and fit into the receptacle as shown in Fig. 1, thus closing the front end of the receptacle. When the receptacle is in tilted unloading position, the bar 22 will engage the surface of the ground or other unloading place so that the front end of the receptacle will be protected from distortion during the unloading operation.

The adjustable pivotal mounting of the receptacle on the arms 6 and 24 is provided to shift the load in the receptacle either forwardly or backwardly of the framework. This is to adapt the device to operators of the wheelbarrow of different heights; for instance, the height of the rear end of the receptacle during the wheeling operation is important in dumping of the material from the receptacle. An operator of short stature would, of course, have to raise the handles higher than a tall operator of the vehicle in order to shift the load weight forwardly on its pivot. Therefore, for an operator of short stature, the pivot mounting of the receptacle should be in the rear openings in the arms 6 and 24 while with a taller operator, the pivot should be in the forward openings of the arms as illustrated in the drawings, while with an operator of medium stature, the pivot pin should be in the middle openings.

It will be obvious from the foregoing that I have provided an improved pivotal adjustable means for mounting a receptacle on the framework of a wheelbarrow which may be quickly and easily assembled and which is efficient in operation.

What I claim and desire to secure by Letters Patent is:

1. A wheelbarrow comprising a frame including side rails, supports mounted on the forward end of said side rails, said supports having upwardly extending forward and rear arms, a receptacle pivotally mounted on the rear arms at substantially the center of the receptacle, said receptacle being forwardly tapered and having its forward end open, and a door conforming to the shape of said opening in the receptacle, said door being pivotally mounted on the top of said forward arms so as to close said opening when the receptacle is in load carrying position and adapted to swing backwardly when the receptacle is empty.

2. A wheelbarrow comprising a frame including side rails, supports mounted on the forward end of said side rails, said supports having upwardly extending forward and rear arms, a receptacle pivotally mounted on the rear arms at substantially the center of the receptacle, said receptacle being forwardly tapered and having its forward end open, a door conforming to the shape of said opening in the receptacle, said door being pivotally mounted on the top of said forward arms so as to close said opening when the receptacle is in load carrying position and adapted to swing backwardly when the receptacle is empty, and means on said rear support and said receptacle for adjusting the pivot point of said receptacle with respect to said frame.

3. A wheelbarrow comprising a frame including side rails, supports mounted on the forward end of said side rails, said supports having upwardly extending forward and rear arms, a receptacle pivotally mounted on the rear arms at substantially the center of the receptacle, said receptacle being forwardly tapered and having its forward end open, a door conforming to the shape of said opening in the receptacle, said door being pivotally mounted on the top of said forward arms so as to close said opening when the receptacle is in load carrying position, means on said rear support and said receptacle for adjusting the pivot point of said receptacle with respect to said frame, and means for latching said receptacle in carrying position.

4. A wheelbarrow comprising a frame including side rails, supports mounted on the forward end of said side rails, said supports having upwardly extending forward and rear arms, a receptacle pivotally mounted on the rear arms at substantially the center of the receptacle, said receptacle being forwardly tapered and having its forward end open, a door conforming to the shape of said opening in the receptacle, said door being pivotally mounted on the top of said forward arms so as to close said opening when the receptacle is in load carrying position, means on said rear support and said receptacle for adjusting the pivot point of said receptacle with respect to said frame, means for latching said receptacle in load carrying position, and means carried by one of said side rails for releasing said latching means so that the receptacle may tilt forwardly on its pivot to dump a load carried thereby.

5. The combination with a wheelbarrow having handle bars and a container having an open forward end, a support connected to the forward end of said handle bars having front and rear arms, said container being pivotally mounted on said rear arms so as to swing from a carrying position to a forwardly and downwardly tilted dumping position, a door pivotally mounted on the front arms of the support, and means carried by said door for preventing the door from swinging forwardly when the receptacle is in dumping position.

6. The combination with a wheelbarrow having handle bars and a container having an open forward end, a V-shaped support rigidly connected to the forward end of said handle bars having front and rear arms, said container being pivotally mounted on said rear arm so as to swing from a carrying position to a forwardly and downwardly tilted dumping position and said container being adjustable on said rear arm for shifting the pivot point of the container with relation to said handle bars, and a door for said open end of the container pivotally mounted on said front arms of the support.

7. The combination with a wheelbarrow having handle bars and a container having an open forward end, a V-shaped support rigidly connected to the forward end of said handle bars having front and rear arms, said container being pivotally mounted on said rear arms so as to swing from a carrying position to a forwardly and downwardly tilted dumping position and said container being adjustable on said rear arm for shifting the pivot point of the container with relation to said handle bars, a door for said open end of the container pivotally mounted on said front arms of the support, and latching means carried by said handle bars and the rear end of the container to hold the container to the handle bars while in carrying position.

8. The combination with a wheelbarrow having handle bars and a container having an open forward end, a V-shaped support rigidly connected to the forward end of said handle bars having front and rear arms, said container being pivotally mounted on said rear arms so as to swing from a carrying position to a forwardly and downwardly tilted dumping position and said container being adjustable on said rear arm for shifting the pivot point of the container with relation to said handle bars, a door for said open end of the container pivotally mounted on said front arms of the support, latching means carried by said handle bars and the rear end of the container to hold the container to the handle bars while in carrying position, and braking means to hold the wheelbarrow in immobile position.

9. The combination with a wheelbarrow having handle bars and a container having an open forward end, a V-shaped support rigidly connected to the forward end of said handle bars having front and rear arms, said container being pivotally mounted on said rear arms so as to swing from a carrying position to a forwardly and downwardly tilted dumping position and said container being adjustable on said rear arms for shifting the pivot point of the container with relation to said handle bars, a door for said open end of the container pivotally mounted on said front arms of the support, and hooks on said door for engaging the forward arms of the support to prevent the door from swinging forwardly when the receptacle is in dumping position.

10. The combination with a wheelbarrow having handle bars and a container having an open forward end, a V-shaped support rigidly connected to the forward end of said handle bars having front and rear arms, said container being pivotally mounted on said rear arms so as to swing from a carrying position to a forwardly and downwardly tilted dumping position and said container being adjustable on said rear arm for shifting the pivot point of the container with relation to said handle bars, a door for said open end of the container pivotally mounted on said front arms of the support, and latching means carried by said handle bars and the rear end of the container to hold the container to the handle bars while in carrying position, said latching means including a plate carried by the rear end of the receptacle, a latch carried by the side rails and a finger lever carried by one of said rails.

MILLARD F. CHEEK.